(12) United States Patent
Dölker

(10) Patent No.: US 8,099,222 B2
(45) Date of Patent: Jan. 17, 2012

(54) METHOD FOR AUTOMATICALLY CONTROLLING THE CHARGE AIR TEMPERATURE OF AN INTERNAL COMBUSTION ENGINE

(75) Inventor: Armin Dölker, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 543 days.

(21) Appl. No.: 12/284,250

(22) Filed: Sep. 19, 2008

(65) Prior Publication Data

US 2009/0114170 A1    May 7, 2009

(30) Foreign Application Priority Data

Oct. 1, 2007  (DE) .................. 10 2007 047 089

(51) Int. Cl.
*F01P 7/14* (2006.01)
*F01P 7/02* (2006.01)
(52) U.S. Cl. ................... 701/102; 123/41.09; 123/41.12
(58) Field of Classification Search ............... 123/41.01, 123/41.02, 41.05, 41.08, 41.09, 41.1, 41.12, 123/41.13, 41.15, 540, 543, 542
See application file for complete search history.

(56) References Cited

U.S. PATENT DOCUMENTS

| | | | | |
|---|---|---|---|---|
| 2,377,028 A * | 5/1945 | Nicholas | .................... | 123/41.09 |
| 3,863,612 A * | 2/1975 | Wiener | ...................... | 123/41.08 |
| 4,180,032 A * | 12/1979 | Plegat | .......................... | 123/563 |
| 4,621,594 A * | 11/1986 | Kubis | ......................... | 123/41.09 |
| 4,697,551 A * | 10/1987 | Larsen et al. | .............. | 123/41.31 |
| 5,020,482 A * | 6/1991 | Deutschmann | ............ | 123/41.29 |
| 6,158,399 A * | 12/2000 | Ash et al. | .................... | 123/41.31 |
| 6,196,167 B1 * | 3/2001 | Marsh et al. | ................ | 123/41.09 |
| 6,390,031 B1 * | 5/2002 | Suzuki et al. | ................ | 123/41.1 |
| 6,491,001 B1 * | 12/2002 | Dean et al. | ................. | 123/41.31 |
| 6,684,826 B2 * | 2/2004 | Yoshikawa et al. | .......... | 123/41.1 |
| 7,263,954 B2 * | 9/2007 | Piddock et al. | ............ | 123/41.09 |

FOREIGN PATENT DOCUMENTS

DE     102 23 686     12/2003
DE     201 22 420     9/2005

* cited by examiner

*Primary Examiner* — Stephen K Cronin
*Assistant Examiner* — Raza Najmuddin
(74) *Attorney, Agent, or Firm* — Lucas & Mercanti, LLP; Klaus P. Stoffel

(57) ABSTRACT

A method for automatically controlling the charge air temperature of an internal combustion engine, in which a coolant flow upstream of a recooler is distributed as a function of the position of a characteristic diagram-type thermostat valve between a recooler coolant flow and a bypass coolant flow. The temperature of the charge air cooler coolant flow is determined downstream of the recooler by the reunited coolant flows, i.e., the recooler coolant flow and the bypass coolant flow. The charge air temperature is determined by the temperature of the charge air cooler coolant flow. A control deviation of a nominal charge air temperature from an actual charge air temperature is computed, a nominal bypass coolant flow is computed as a correcting variable from the control deviation by means of a charge air temperature controller, a control signal (PWM) for actuating the characteristic diagram-type thermostat valve is determined from the nominal bypass coolant flow by a computing unit, and the position of the characteristic diagram-type thermostat valve (6) is determined by the control signal (PWM).

10 Claims, 5 Drawing Sheets

METHOD FOR AUTOMATICALLY CONTROLLING THE CHARGE AIR TEMPERATURE OF AN INTERNAL COMBUSTION ENGINE

BACKGROUND OF THE INVENTION

The invention concerns a method for automatically controlling the charge air temperature of an internal combustion engine.

The journal Schiff & Hafen/Kommandobrücke, No. 1/1990, pp. 49-50, describes a coolant circuit system of an internal combustion engine. The coolant circuit system consists of a high-temperature circuit with a coolant pump and a low-temperature circuit branching off from the high-temperature circuit. A thermostat valve, a recooler with a bypass line, a charge air cooler, and a lubricating oil heat exchanger are arranged in series in the low-temperature circuit. The coolant flow in the low-temperature circuit that branches off from the high-temperature circuit is distributed according to the position of the thermostat valve between a recooler coolant flow, which passes through the recooler, and a bypass coolant flow. After the recooler, the two coolant flows are brought back together and fed to the charge air cooler as the charge air cooler coolant flow. The thermostat valve thus determines, via the distribution of the coolant flow, the temperature of the charge air cooler coolant flow. The temperature of the charge air cooler coolant flow in turn defines, via the temperature difference versus the charge air temperature, the amount of heat extracted from the charge air in the charge air cooler. For example, when the internal combustion engine is at full load, the thermostat valve is completely open, so that the entire coolant flow of the low-temperature circuit flows through the recooler, and therefore the greatest possible amount of thermal energy is extracted from the charge air. When the internal combustion engine is idling, the thermostat valve is completely closed, so that the entire coolant flow of the low-temperature circuit flows through the bypass line, and very little thermal energy is extracted from the charge air. The switching state of the thermostat valve is determined by a thermostatic operating element such as an element made of a material which expands with temperature. When the temperature of the coolant flow increases, therefore, the thermostat valve expands and opens, and when the temperature of the coolant flow decreases, the valve contracts and closes with the assistance of spring tension. Because of the way in which the thermostat valve is designed, automatic control of the charge air temperature is still not possible at all operating points.

DE 201 22 420 U1 discloses an electrically heated thermostat valve in which the characteristic curve of the thermostatic operating element can be shifted by the electric control of the heating element. For example, when an internal combustion engine is cold and is required to operate under high load, the coolant flow can be influenced by the bypass line at an earlier time than would be possible by the thermostatic operating element. In the remainder of the text, a thermostat valve of this type will be referred to as a thermostat valve of the "characteristic diagram" type. DE 102 23 686 A1 discloses a corresponding method for controlling this characteristic-diagram type thermostat valve. It describes a two-position control arrangement with input control of the operating element. However, this method does not offer significant improvement with respect to the automatic control of the charge air temperature in the coolant circuit system described above.

SUMMARY OF THE INVENTION

Therefore, the object of the invention is to provide an improved method for automatically controlling the charge air temperature in the coolant circuit system described above.

The charge air temperature is automatically controlled by computing a control deviation between a nominal charge air temperature and an actual charge air temperature and by using a charge air temperature controller to compute a nominal bypass coolant flow as a correcting variable on the basis of the control deviation. A control signal for actuating the characteristic-diagram type thermostat valve is then determined from the nominal bypass coolant flow by a computing unit. The position of the characteristic-diagram type thermostat valve is in turn ultimately determined by the control signal. The computing unit comprises a first function block for computing a nominal thermostat displacement, a second function block for computing a nominal voltage from the nominal thermostat displacement, and a third function block for converting the nominal voltage to the control signal such as a PWM signal. The nominal voltage is computed by means of an inverse characteristic thermostat diagram and a correction curve.

The method of the invention allows automatic control of the charge air temperature over the entire operating range of the internal combustion engine.

The advantages are:

Pollutant emissions are improved, i.e., reduced, because of the lowering of the charge air temperature.

Increasing the charge air temperature lowers the ignition pressure gradient, which has a positive effect on the load on the internal combustion engine and allows it to run more quietly.

Because the internal combustion engine and the exhaust gas lines are prevented from cooling off, fuel consumption and the formation of white smoke and black smoke are reduced.

The automatic control of the charge air temperature, furthermore, is now independent of the temperature of the coolant, e.g., seawater, supplied to the recooler.

In one embodiment of the invention, it is provided that an input control value is also used to compute the nominal bypass coolant flow serving as a correcting variable. This input control value is determined by means of a characteristic diagram as a function of engine speed and a power-determining signal such as a nominal torque or a nominal injection quantity.

Other features and advantages of the present invention will become apparent from the following description of the invention.

DETAILED DESCRIPTION OF THE INVENTION

Figure 1:
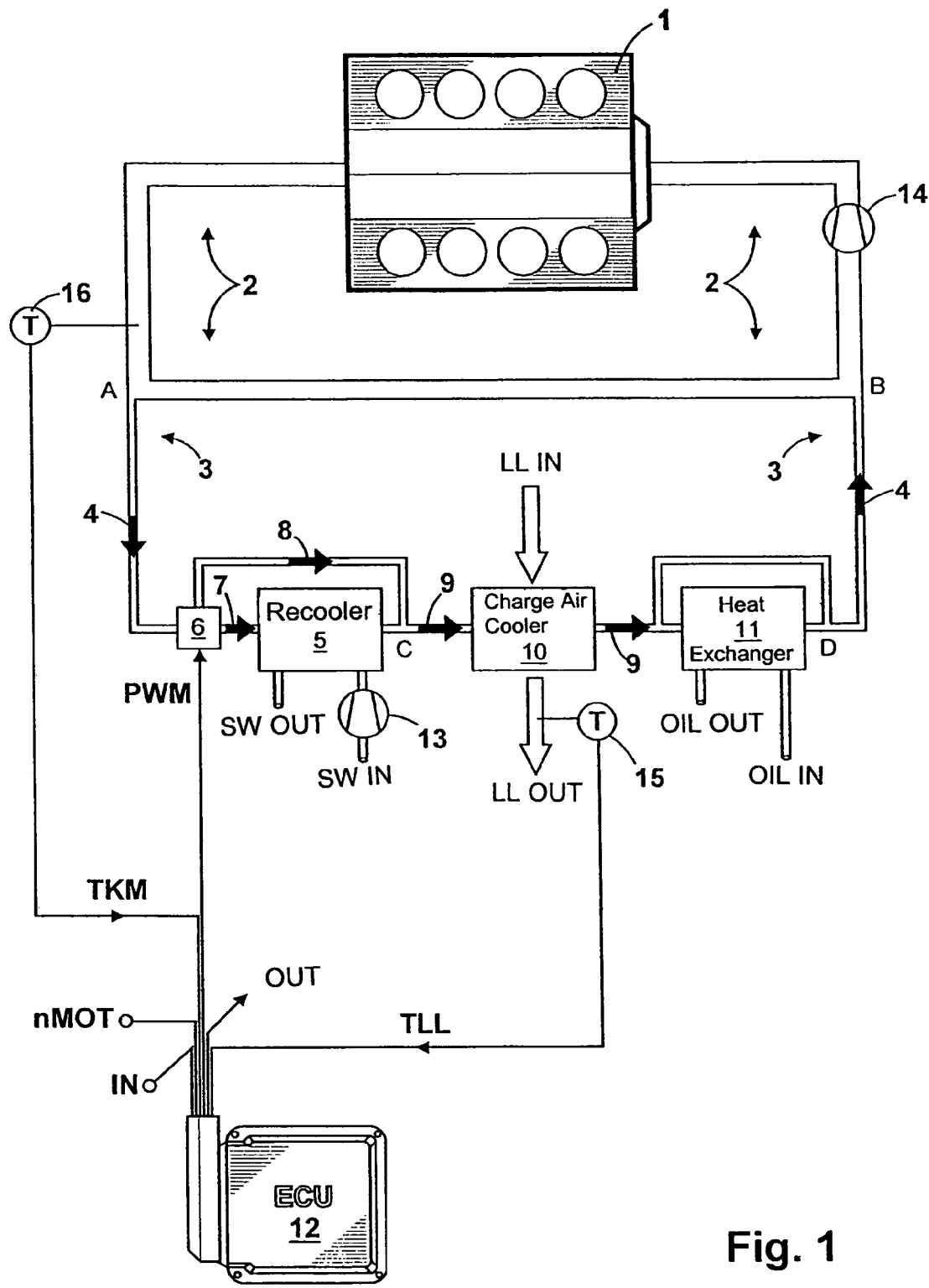
FIG. 1 shows a system diagram.

FIG. 1 shows a system diagram. The coolant circuit system for cooling the internal combustion engine 1 comprises a high-temperature circuit 2 with a coolant pump 14 and a low-temperature circuit 3. The low-temperature circuit 3 branches off from the high-temperature circuit 2 at a point A and reenters the high-temperature circuit 2 at a point B. The coolant flow in the high-temperature circuit 2 and in the low-temperature circuit 3 is adjusted by a throttle point (not shown) in the high-temperature circuit 2. The coolant flow in the low-temperature circuit 3 after the point (point A) at which it branches from the high-temperature circuit 2 is labeled in the drawing as coolant flow 4. A characteristic-diagram type thermostat valve 6, a recooler 5 with a bypass line, a charge air cooler 10, and a lubricating oil heat exchanger 11 are arranged in series in the low-temperature circuit 3. As a function of the position of the characteristic-diagram type thermostat valve 6, the coolant flow 4 is distributed between a recooler coolant flow 7 and/or a bypass coolant flow 8. When the characteristic-diagram type thermostat valve 6 is completely closed, the entire coolant flow 4 is carried around the recooler 5 through the bypass line. When the characteristic-diagram type thermostat valve 6 is completely open, the entire coolant flow 4 flows through the recooler 5. In the recooler 5, heat is transferred from the recooler coolant flow 7 to the seawater SW, so that the recooler coolant flow 7 is cooled. The seawater is supplied by its own seawater pump 13. After it flows through the recooler 5, the seawater is returned. In FIG. 1, the seawater feed is denoted SW IN, and the seawater return is denoted SW OUT.

At point C, the recooler coolant flow 7 and the bypass coolant flow 8 are brought back together. This corresponds to the charge air cooler coolant flow 9, the temperature of which is determined by the volumes and temperatures of the recooler coolant flow and of the bypass coolant flow. The charge air cooler coolant flow 9 then flows through the charge air cooler 10, in which heat is transferred from the charge air to the charge air cooler coolant flow 9, which has the effect of considerably cooling the charge air. The charge air is supplied by the compressor of an exhaust gas turbocharger (not shown). After it flows through the charge air cooler 10, the charge air is supplied to the combustion chambers of the internal combustion engine. In FIG. 1, the charge air feed is denoted LL IN, and the charge air return is denoted LL OUT. The heated charge air cooler coolant flow 9 then flows through the lubricating oil heat exchanger 11, in which heat is transferred from the lubricant to the charge air cooler coolant flow 9, thereby cooling the lubricant. In FIG. 1, the lubricant feed is denoted OIL IN, and the lubricant return is denoted OIL OUT. A portion of the charge air cooler coolant flow 9 is conveyed around the lubricating oil heat exchanger 11 through a bypass line. At point D, the two volumes are brought back together again, and the combined flow is then fed back into the high-temperature circuit 2 at point B.

Reference number 12 denotes an electronic engine control unit (ECU), which determines the behavior of the internal combustion engine 1. The electronic engine control unit 12 contains the usual components of a microcomputer system such as a microprocessor, interface adapters, buffers, and memory components (EEPROM, RAM). Operating characteristics relevant to the operation of the internal combustion engine 1 are stored in the memory components in the form of characteristic diagrams/characteristic curves. The electronic engine control unit 12 uses these to compute the output variables from the input variables. FIG. 1 shows the following input variables as examples: the engine speed nMOT; the charge air temperature TLL (raw values), which is measured by a temperature sensor 15; the (high-temperature circuit) coolant temperature TKM, which is measured by a temperature sensor 16; and an input variable IN. Examples of input variables IN are the rail pressure of a common rail system and the power output required by the operator. As output variables of the electronic engine control unit 12, FIG. 1 shows a signal PWM for controlling the characteristic-diagram type thermostat valve 6 and an output variable OUT. The output variable OUT is representative of additional control signals for the open-loop and closed-loop control of the internal combustion engine 1 such as a control signal for the start or end of injection and a signal for actuating a suction throttle in a common rail system.

Figure 2:
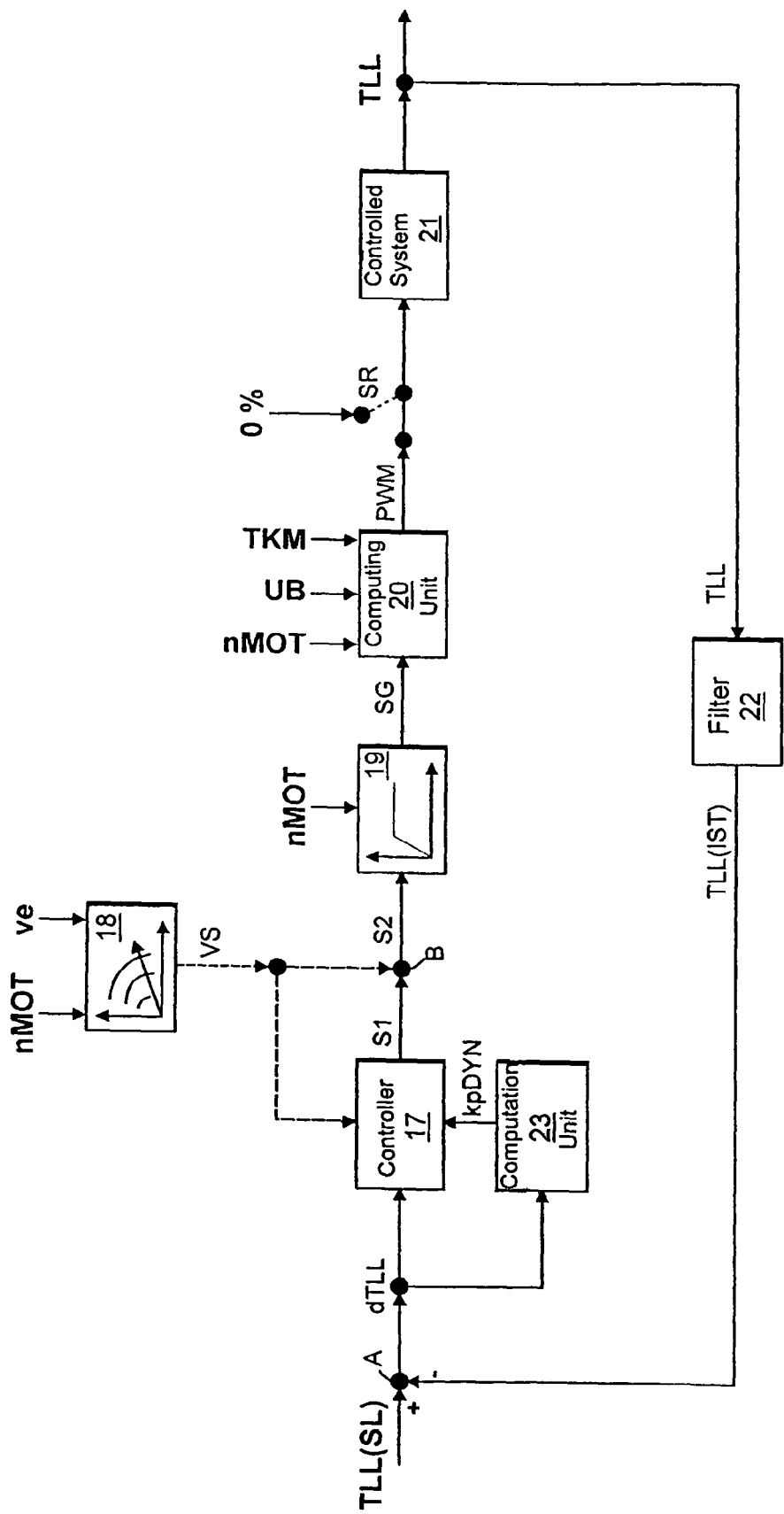
FIG. 2 shows an automatic control circuit for automatic charge air control.

FIG. 2 shows an automatic control circuit for automatically controlling the charge air temperature. The input variables of the automatic control circuit are the nominal charge air temperature TLL(SL), the engine speed nMOT, a power-determining signal ve, the (high-temperature circuit) coolant temperature TKM, and the battery voltage UB. The power-determining signal ve corresponds to a nominal torque in the case of a torque-based engine control system or a nominal injection quantity in the case of an injection quantity-based engine control system. No control signal is sent if it is detected that the internal combustion engine has been stopped. This means that the characteristic-diagram type thermostat valve is completely closed. The output variable of the automatic control circuit corresponds to the raw values of the charge air temperature TLL.

The nominal charge air temperature TLL(SL) is computed as a function of the engine speed nMOT and the power-determining signal ve as the output variable of a 3D characteristic diagram (not shown). Optionally, a filter can be provided. At point A, a control deviation dTLL is computed from the nominal charge air temperature TLL(SL) and an actual charge air temperature TLL(IST). The control deviation dTLL is the input variable of a charge air temperature controller 17. The charge air temperature controller 17 is preferably realized as a PI controller, but a PID controller or a PIDT1 controller would also be possible. To improve the controller dynamics, a proportional coefficient kp can be computed so that the P component can also be calculated as a function of the control deviation dTLL:

$$kp = kpSTAT + kpDYN \text{ where } kpDYN = f(dTLL)$$

In this equation, kp is the proportional coefficient; kpSTAT is a predetermined, static proportional coefficient; and kpDYN is a dynamic proportional coefficient. The dynamic proportional coefficient kpDYN is computed by a unit 23.

If desired, an input control value VS can be added to the output variable S1 of the charge air temperature controller 17 at point B. The sum corresponds to the signal S2. The input control value VS is determined by an input control characteristic diagram 18, which has two input variables: the engine speed nMOT and the power-determining signal ve. The addition at point B represents disturbance-variable compensation and is meant to improve the dynamics of the automatic control circuit. If no input control is provided, the I component of the charge air temperature controller 17 has a lower limit of zero. If input control is applied, the negative input control value VS serves as the lower limit of the I component of the charge air temperature controller 17. With respect to the upper limit, the I component of the charge air temperature controller 17 is bounded by the following value as a function of the engine speed NMOT:

$$WERT = (nMOT \cdot VMAX)/nNENN \quad \text{(Formula 1)}$$

where:
WERT value of upper limit of the nominal bypass coolant flow
nMOT actual rpm
nNENN nominal rpm
VMAX maximum bypass coolant flow The lower limit of the signal S2 is zero, and the upper limit is determined according to Formula 1. The upper limit thus corresponds to the assignment WERT. This is accomplished by the limiter 19. The output variable of the limiter 19 represents the correcting variable (reference letters SG) of the automatic charge air temperature control circuit. It is identical to the nominal bypass coolant flow. The lower limit of the nominal bypass coolant flow is zero. The upper limit is computed by Formula 1, in which WERT corresponds to the upper limit.

Figure 3:
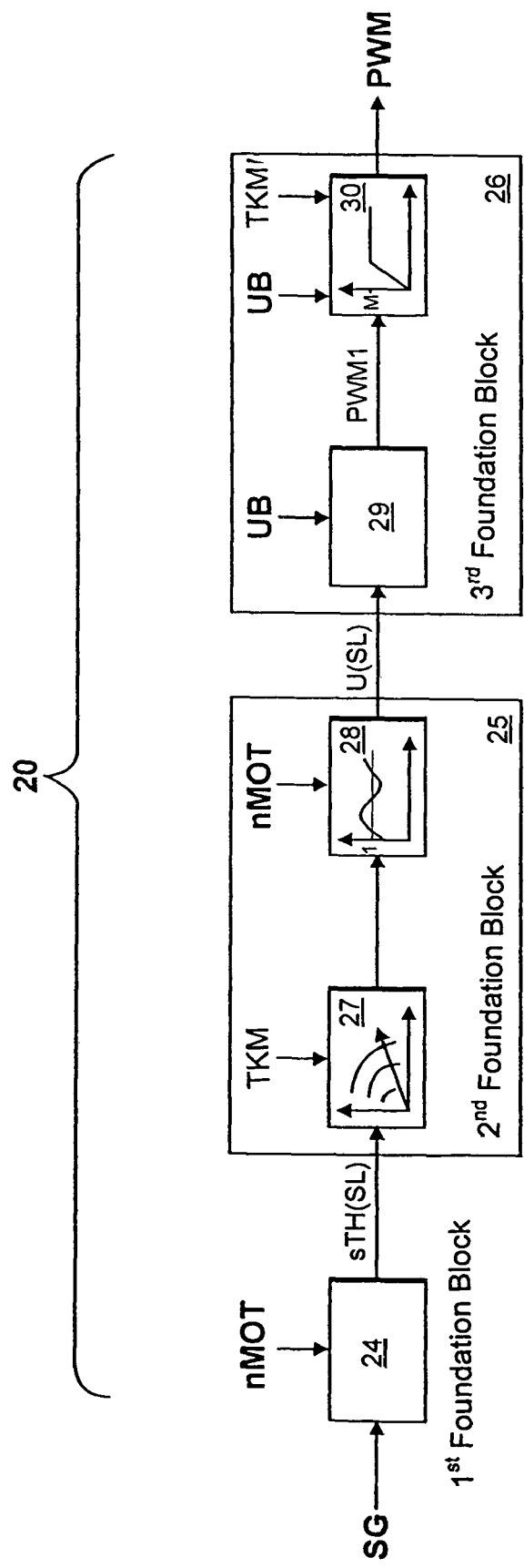
FIG. 3 shows a block diagram of the computing unit.

The correcting variable SG is converted to a control signal PWM by a computing unit 20 as a function of the speed nMOT, the (high-temperature circuit) coolant temperature TKM, and the battery voltage UB. The computing unit 20 is shown in FIG. 3 and is explained in connection with FIG. 3. Either the control signal PWM (solid line) or the constant value of 0% (broken line) is sent to the controlled system 21 by means of the switch SR. The controlled system 21 comprises the characteristic diagram-type thermostat valve 6, the recooler 5 with bypass line, and the charge air cooler 10. The output variable of the controlled system 21, i.e., the controlled variable, corresponds to the raw values of the charge air temperature TLL. A filter 22, which is located in the feedback line, computes the actual charge air temperature TLL(IST) from the raw values of the charge air temperature TLL, and this actual charge air temperature TLL(IST) is returned to point A. The automatic control circuit is thus closed.

How the automatic control circuit works can be explained in the following way: If the actual charge air temperature TLL(IST) is lower than the nominal charge air temperature TLL(SL), then the bypass coolant flow must be increased to allow the actual charge air temperature TLL(IST) to rise. This is so, because the correcting variable SG of the automatic control circuit is increased in the case of a positive control deviation. On the other hand, if the actual charge air temperature TLL(IST) is higher than the nominal charge air temperature TLL(SL), then the bypass coolant flow must be reduced to allow the coolant to cool and the actual charge air temperature TLL(IST) to drop. This is accomplished by reducing the correcting variable SG of the closed-loop control system when the control deviation dTLL is negative.

FIG. 3 shows a block diagram of the computing unit 20. The computing unit 20 comprises a first function block 24 for computing a nominal thermostat displacement sTH(SL), a second function block 25 for computing a nominal voltage U(SL), and a third function block 26 for converting the nominal voltage U(SL) to the control signal PWM. The first function block 24 uses a mathematical function to compute the nominal thermostat displacement sTH(SL) from the correcting variable SG as a function of the engine speed nMOT. In a simple embodiment, a linear equation for a decreasing straight line is stored as the mathematical function. The first corner point of the straight line is based on the fact that, at the maximum nominal thermostat displacement sTH(SL), the characteristic diagram-type thermostat valve is completely open, and thus the nominal bypass coolant flow is zero. A second corner point of the straight line is based on the fact that, at a nominal thermostat displacement sTH(SL) of zero, the characteristic diagram-type thermostat valve is completely closed, and the nominal bypass coolant flow is at maximum. The maximum nominal bypass coolant flow depends on the engine speed NMOT and is computed according to Formula 1, in which WERT represents the maximum nominal bypass coolant flow.

The second function block 25 converts the nominal thermostat displacement sTH(SL) to a nominal voltage U(SL). The physical behavior of the characteristic diagram-type thermostat valve is as follows: If a certain voltage is applied here at a certain coolant temperature, a certain thermostat displacement is obtained. If the temperature of the coolant changes, or if a different voltage is applied, a different thermostat displacement is obtained. This relationship can be described in the form of a 3D characteristic diagram:

$$sTH(SL) = f(TKM, U(SL))$$

where TKM is the coolant temperature, U(SL) is the nominal voltage, and sTH(SL) is the set thermostat displacement. To automatically control the charge air temperature TLL, this input-output map must be inverted. We thus have:

$$U(SL) = f[TKM, sTH(SL)]$$

The nominal voltage U(SL) is thus computed as a function of the coolant temperature TKM and the nominal thermostat displacement sTH(SL). The heat input of the heating element into the expanding material element of the characteristic diagram-type thermostat valve depends on the flow rate of the coolant. If the coolant flows faster, then the heat input into the expanding material element is possibly somewhat lower. The flow rate of the coolant in turn depends on the engine speed, since the coolant pump (14 in FIG. 1) is driven by the crankshaft of the internal combustion engine. The inverse thermostat characteristic diagram type is denoted by reference number 27. Because of the dependence on engine speed, a speed-dependent correction curve 28 is added to the output side of the inverse thermostat characteristic diagram 27. The output variable of the second function block 25 is the nominal voltage U(SL).

In the third function block 26, a control signal PWM for actuating the characteristic diagram-type thermostat valve is assigned the nominal voltage U(SL). For this purpose, a computing unit 29 converts the nominal voltage U(SL) to the duty cycle of the PWM signal as a function of the battery voltage UB. The output variable corresponds to the signal PWM1 and is in the form of a percentage value. Because the resistance of the heating element in the characteristic diagram-type thermostat valve depends on the temperature of the coolant, and because a maximum output power of the output stage in the electronic engine control unit may not be exceeded, the signal PWM1 is limited by a limiter 30 as a function of the battery voltage UB and the coolant temperature TKM. A suitable 3D characteristic diagram is stored in the limiter 30. The output signal of the third function block 26 is the control signal PWM which actuates the characteristic diagram-type thermostat valve.

FIG. 4 shows timing diagrams of the same process. FIG. 4 comprises FIGS. 4A to 4F. FIG. 4A shows the nominal charge air temperature TLL(SL), FIG. 4B the actual charge air temperature TLL(IST), FIG. 4C the correcting variable SG, FIG. 4D the nominal thermostat displacement sTH(SL), FIG. 4E the nominal voltage U(SL), and FIG. 4F the control signal PWM, which actuates the characteristic diagram-type thermostat valve. At time t1, the entire system is in the steady state. It is assumed that the nominal charge air temperature TLL(SL) suddenly changes from 60° C. to 50° C. at time t2 and suddenly changes back from 50° C. to 60° C. at time t4.

Figure 4A:
FIG. 4 shows timing diagrams (FIGS. 4A to 4F)
Figure 4B:
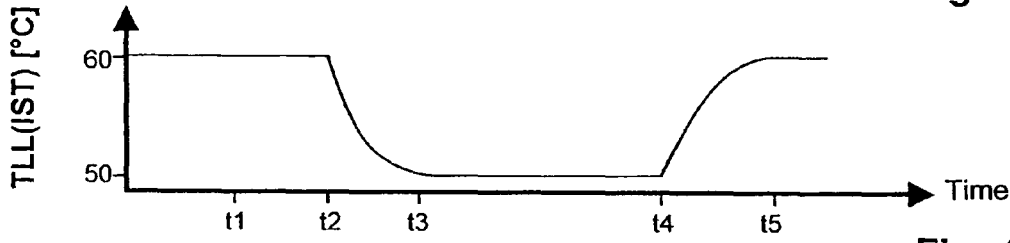
Figure 4C:
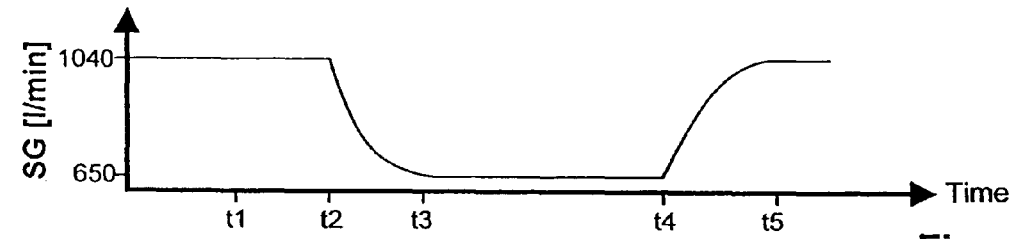
Figure 4D:
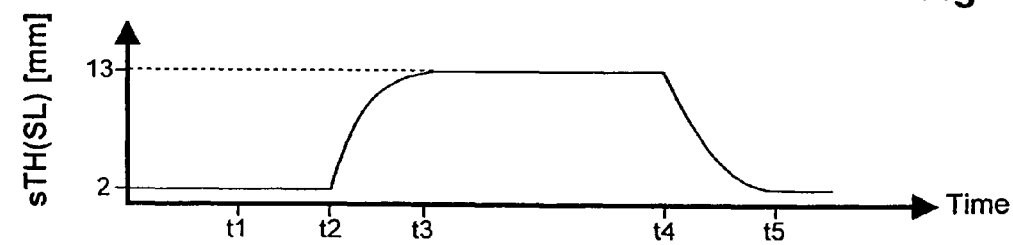
Figure 4E:
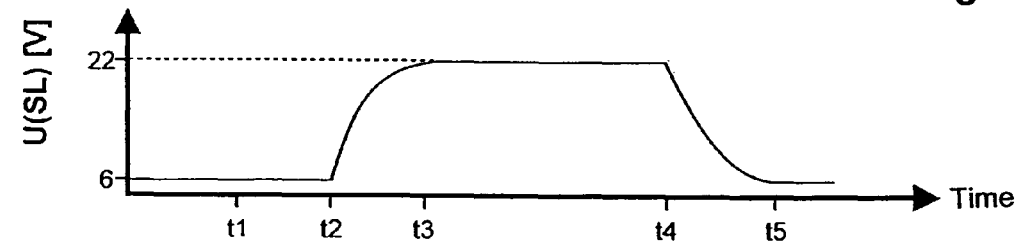
Figure 4F:
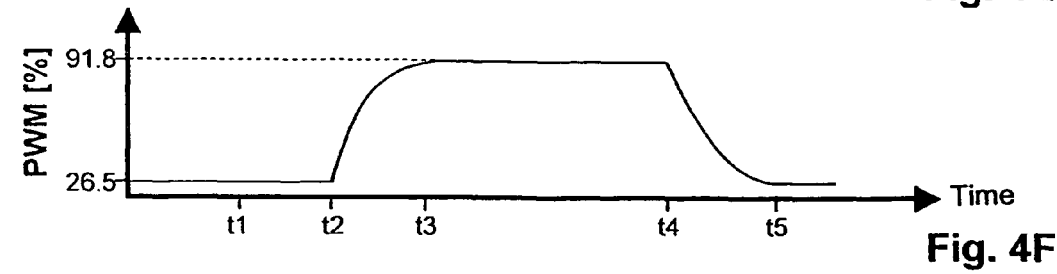

As a result of the automatic charge air temperature control, the following signal behaviors are obtained:

If the nominal charge air temperature TLL(SL) is lowered at time t2, a negative control deviation is obtained. In the time period t2/t3, the charge air temperature controller reacts to this by reducing the correcting variable SG, which corresponds to the nominal bypass coolant flow (FIG. 4C). A decreasing correcting variable SG is converted by the computing unit 20 to an increasing nominal thermostat displacement sTH(SL) (see FIG. 4D), to an analogously behaving nominal voltage U(SL) (see FIG. 4E), and to a control signal PWM with an increasing duty cycle (see FIG. 4F). As a result, the characteristic diagram-type thermostat valve is actuated in the opening direction, so that the bypass coolant flow decreases. The recooler coolant flow, which flows through the recooler, increases accordingly. This means that the cooling capacity is increased. As a result, a decreasing actual charge air temperature TLL(IST) is obtained, which asymptotically approaches the nominal charge air temperature TLL(SL).

If, on the other hand, the nominal charge air temperature increases, as at time t4, a positive control deviation is obtained. Therefore, in the time period t4/t5, the charge air temperature controller computes an increasing correcting variable SG. A decreasing nominal thermostat displacement sTH(SL), an analogously behaving nominal voltage U(SL), and a drive signal PWM with a decreasing duty cycle (see FIG. 4F) are assigned to the increasing correcting variable SG by the computing unit 20. As a result, the characteristic diagram-type thermostat valve is actuated in the closing direction, so that the bypass coolant flow increases. The recooler coolant flow decreases accordingly. This means that the cooling capacity is reduced. As a result, an increasing actual charge air temperature TLL(IST) is obtained, which again asymptotically approaches the nominal charge air temperature TLL(SL).

Figure 5:
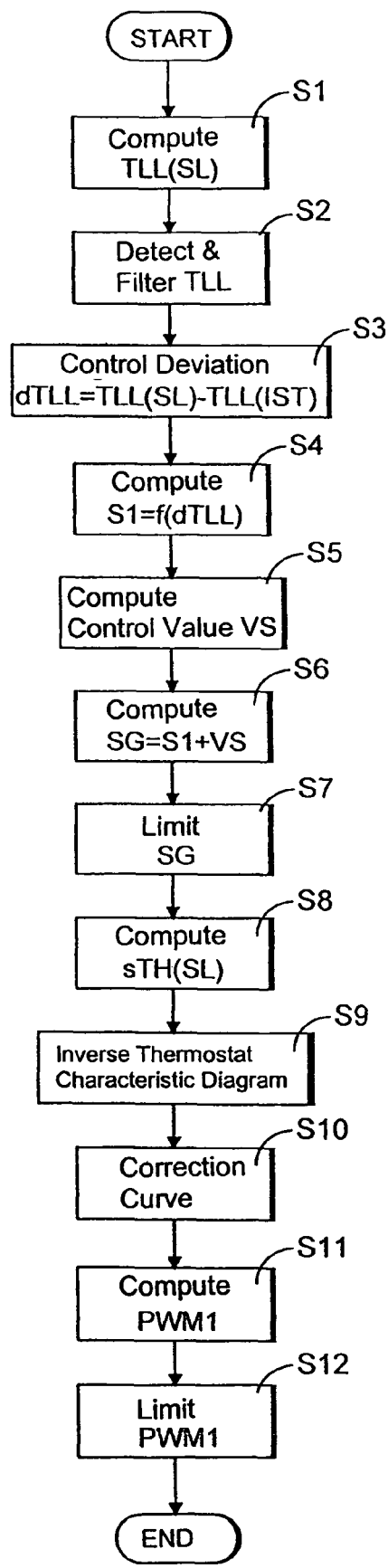
FIG. 5 shows a program flowchart.

FIG. 5 shows a program flowchart. At S1, the nominal charge air temperature TLL(SL) is computed by a 3D characteristic diagram as a function of engine speed and the power-determining signal such as a nominal torque or a nominal injection quantity. At S2, the charge air temperature TLL (raw values) is detected and filtered. The result corresponds to the actual charge air temperature TLL(IST). A control deviation dTLL is then computed at S3. At S4, an output signal S1 is computed by the charge air temperature controller as a function of the control deviation dTLL. At S5, an input control value VS is computed by the input control unit (18 in FIG. 2), and at S6 the values of the two signals S1 and VS are added. The sum represents the correcting signal SG. At S7, the correcting signal SG is limited as a function of the engine speed. At S8 the nominal thermostat displacement sTH(SL) is determined by the first function block (24 in FIG. 3). The nominal voltage U(SL) is computed by means of the inverse thermostat characteristic diagram at S9 and the correction curve at S10. At S11 the signal PWM1 is then computed from the nominal voltage U(SL) as a function of the battery voltage UB, and at S12 it is limited as a function of the battery voltage UB and the coolant temperature TKM. The output value corresponds to the control signal PWM, with which, finally, the characteristic diagram-type thermostat valve is actuated. This ends the program flowchart.

The advantages of the automatic control of the charge air temperature can be summarized as follows:

Pollutant emissions are improved, i.e., reduced.
The ignition pressure gradient is reduced.
White and black smoke production is reduced.
Fuel consumption is reduced.
Engine wear is reduced.
The charge air temperature is independent of the recooler coolant, e.g., it is independent of the seawater temperature.

Although the present invention has been described in relation to particular embodiments thereof, many other variations and modifications and other uses will become apparent to those skilled in the art. It is preferred, therefore, that the present invention be limited but by the specific disclosure herein, but only by the appended claims.

The invention claimed is:

1. A method for automatically controlling charge air temperature (TLL) of an internal combustion engine, comprising the steps of: distributing a coolant flow upstream of a recooler as a function of a position of a characteristic diagram-type thermostat valve between a recooler coolant flow and a bypass coolant flow; determining temperature of a charge air cooler coolant flow downstream of the recooler by reunited coolant flows; determining the charge air temperature (TLL) by the temperature of the charge air cooler coolant flow; computing a control deviation (dTLL) of a nominal charge air temperature ((TLL(SL)) from an actual charge air temperature (TLL(IST)), whereby the nominal charge air temperature ((TLL(SL)) is determined at least as a function of engine speed (nMOT); computing a nominal bypass coolant flow as a correcting variable (SG) from the control deviation (dTLL) by means of a charge air temperature controller; determining a control signal (PWM) for actuating the characteristic diagram-type thermostat valve from the nominal bypass coolant flow by a computing unit; and determining the position of the characteristic diagram-type thermostat valve by the control signal (PWM).

2. The method according to claim 1, further including determining an input control value (VS) by using an input control characteristic diagram as a function of the engine speed (NMOT) and a power-determining signal (ve), and using the input control valve (VS) as a correcting variable (SG) to compute the nominal bypass coolant flow.

3. The method according to claim 2, wherein an I component of the charge air temperature controller has a lower limit, which corresponds to the input control value (VS).

4. The method according to claim 1, including computing an upper limit of an I component of the charge air temperature controller as a function of engine speed (nMOT), a nominal engine speed (nNENN), and a maximum bypass coolant flow (VMAX).

5. The method according to claim 1, including determining a P component of the charge air temperature controller from a static proportional coefficient (kpSTAT) and a dynamic proportional coefficient (kpDYN), where the dynamic proportional coefficient (kpDYN) is computed as a function of the control deviation (dTLL).

6. The method according to claim 1, wherein the control signal (PWM) for actuating the characteristic diagram-type thermostat valve is computed from the nominal bypass coolant flow by assigning a nominal thermostat displacement (sTH(SL)) to the correcting variable (SG) by a first function block in the computing unit, by converting the nominal thermostat displacement (sTH(SL)) to a nominal voltage (U(SL)) by a second function block, and by computing the control signal (PWM) from the nominal voltage (U(SL)) by a third function block.

7. The method according to claim 6, including computing the nominal voltage (U(SL)) from the nominal thermostat displacement (sTH(SL)) by an inverse thermostat characteristic diagram and a correction curve.

8. The method according to claim 7, including determining the control signal (PWM) from the nominal voltage (U(SL)) by a computing unit and a limiter.

9. The method according to claim 1, further including setting the control signal (PWM) to zero when an engine shutdown is detected.

10. The method according to claim 1, including filtering the nominal charge air temperature (TLL(SL)), and computing the actual charge air temperature (TLL(IST)) from the charge air temperature (TLL) by a filter.

* * * * *